(12) United States Patent
Wallace (10) Patent No.: US 10,834,906 B2
(45) Date of Patent: Nov. 17, 2020

(54) SMALL HIVE BEETLE TRAP AND METHOD OF USE

(71) Applicant: Bruce Quentin Wallace, Beerwah (AU)

(72) Inventor: Bruce Quentin Wallace, Beerwah (AU)

(*) Notice: Subject to any disclaimer, the term of this patent is extended or adjusted under 35 U.S.C. 154(b) by 324 days.

(21) Appl. No.: 15/951,597

(22) Filed: Apr. 12, 2018

(65) Prior Publication Data

US 2019/0313609 A1 Oct. 17, 2019

(51) Int. Cl.
*A01K 47/06* (2006.01)
*A01M 1/10* (2006.01)
*A01K 51/00* (2006.01)

(52) U.S. Cl.
CPC ............ *A01K 47/06* (2013.01); *A01M 1/10* (2013.01); *A01K 51/00* (2013.01)

(58) Field of Classification Search
CPC ........ A01K 47/00; A01K 47/06; A01K 51/00; A01M 1/10; A01M 1/103
USPC .................................................. 449/2, 3, 50
See application file for complete search history.

(56) References Cited

U.S. PATENT DOCUMENTS

| | | | | |
|---|---|---|---|---|
| 852,907 A * | 5/1907 | Saffell | ................. | A01K 47/06 449/21 |
| 4,867,731 A * | 9/1989 | Willard | ................. | A01K 51/00 449/2 |
| 6,468,129 B1 * | 10/2002 | Griffith | ................. | A01K 51/00 449/20 |
| 7,757,433 B2 * | 7/2010 | Levot | ................. | A01K 47/06 43/107 |
| 2002/0094756 A1 * | 7/2002 | Labesque | ................. | A01K 51/00 449/56 |
| 2006/0141904 A1 * | 6/2006 | Teal | ................. | A01M 1/02 449/2 |
| 2007/0224913 A1 * | 9/2007 | Brisson | ................. | A01K 51/00 449/3 |
| 2008/0280528 A1 * | 11/2008 | Mudd | ................. | A01K 51/00 449/2 |
| 2012/0204477 A1 * | 8/2012 | Fairleigh | ................. | A01M 1/103 43/121 |

(Continued)

FOREIGN PATENT DOCUMENTS

| AU | 2009100077 A4 | 3/2009 |
|---|---|---|
| AU | 2015238870 A1 | 4/2017 |

*Primary Examiner* — Lisa L Tsang
(74) *Attorney, Agent, or Firm* — Barlow, Josephs & Holmes, Ltd.

(57) ABSTRACT

A small hive beetle trap configured to be located beneath a beehive is provided. The trap includes a frame formed from one or more frame members, including a front frame member; an opening for bees to enter and exit the hive via the trap; a small hive beetle entry including at least one channel configured to direct small hive beetle and their larvae that enter the small hive beetle entry away from the hive; a corrugated panel held by the frame and adapted to direct the beetles or the larvae that evade the small hive beetle entry into the troughs of the panel and into at least one opening located within each trough; and a removable tray located beneath the at least one channel and the corrugated panel for collecting and trapping the beetles and/or the larvae that pass through the at least one channel and the opening.

17 Claims, 5 Drawing Sheets

(56) References Cited

U.S. PATENT DOCUMENTS

| | | | | |
|---|---|---|---|---|
| 2013/0145679 A1* | 6/2013 | Nenninger | ............. | A01K 51/00 |
| | | | | 43/114 |
| 2014/0075825 A1* | 3/2014 | Vasudeva | .............. | A01M 1/026 |
| | | | | 43/114 |
| 2016/0330938 A1* | 11/2016 | Jones | ...................... | A01K 55/00 |
| 2017/0065095 A1* | 3/2017 | Wieler | ................. | A47C 31/007 |
| 2017/0265443 A1* | 9/2017 | Winston, III | .......... | B65D 85/50 |
| 2017/0339939 A1* | 11/2017 | Ikawa | .................... | A01N 27/00 |

* cited by examiner

SMALL HIVE BEETLE TRAP AND METHOD OF USE

TECHNICAL FIELD

The present invention relates to a trap for use with a beehive and to a method of use. In particular, the present invention relates to a small hive beetle trap and method of use.

BACKGROUND

The small hive beetle (*Aethina tumida*) is an invasive and destructive pest of beehives causing damage to hive comb, stored honey and pollen.

The primary damage to beehives is through the feeding activity of the larvae of the beetle. Adult female beetles lay egg masses in cracks and crevices in a hive or directly on pollen and brood combs of the hive. In some cases, the beetles may puncture the capping or wall of a brood cell and deposit eggs inside the cell. Within 2-4 days of being laid, the eggs hatch and the larvae immediately begin to feed on pollen, honey and bee brood.

If left untreated, the larvae can cause extensive damage to a hive. For example, the larvae can tunnel through the comb of the hive thereby damaging or destroying comb cell cappings and the comb. The larvae also defecate in hive honey causing the honey to discolour from larvae faeces and introducing yeast into the honey. The yeast, in turn, can cause fermentation and frothiness in the honey. Overall, the damage caused by the larvae can lead to the honey running out of the cells of the comb creating a mess in hives or extracting rooms and ultimately resulting in the bees absconding and the collapse of the hive.

Various devices have been developed to rid infested hives of this pest. Most of the devices rely on an attractant to attract and trap the beetle and/or the larvae.

For example, Australian Innovation Patent No. 2009100077 discloses a trap including one or more openings cut into a hive base that permit only the passage of beetles and their larvae and a removable tray located beneath the openings containing an attractant. The traps works on the premise that the beetles and their larvae are attracted by the attractant through the openings into the removable tray where they are trapped and unable to re-enter the hive. However, as the trap relies on the attractant in order to attract and trap the beetles and larvae, it must continually be replaced, which can be costly and time consuming.

The applicant has addressed one or more of the aforementioned disadvantages or problems by virtue of the trap disclosed in Australian Patent Application No. 2015238870, which is hereby incorporated by reference in its entirety. However, the applicant has recognised that further refinements of the invention are required in order to improve the performance of the trap.

SUMMARY OF INVENTION

Embodiments of the present invention provide a small hive beetle trap and method of use, which may at least partially overcome at least one of the problems or deficiencies mentioned above or which may provide the public with a useful or commercial choice.

According to a first aspect of the present invention, there is provided a small hive beetle trap configured to be located beneath a beehive, said trap comprising:

- a frame formed from one or more frame members, including a front frame member having an inner frame wall, an opposed outer frame wall, a top wall and an opposed bottom wall;
- an opening for bees to enter and exit the beehive via the trap, said opening for bees comprising a first gap defined between at least a portion of the top wall of the front frame member and a lower edge of the beehive;
- a small hive beetle entry located within the opening for bees, said small hive beetle entry comprising:
    - a second gap defined between the at least a portion of the top wall of the front frame member and a rail extending above and parallel to the front frame member, said second gap having a height sufficient to enable a small hive beetle to enter the second gap; and
    - at least one channel located beneath the rail and extending laterally at least partially across the inner frame wall of the front frame member, said channel configured to direct small hive beetles and their larvae that enter the small hive beetle entry away from the hive;
- a corrugated panel held by the frame and adapted to direct said beetles and the larvae that evade the small hive beetle entry into troughs of the corrugated panel, said panel further including at least one opening within each trough that allows the beetles and the larvae to pass through the opening; and
- a removable tray located beneath the at least one channel and the corrugated panel for collecting and trapping the beetles and the larvae that pass through the channel and the opening.

According to a second aspect of the present invention, there is provided a small hive beetle trap configured to be located beneath a beehive, said trap comprising:

- a frame formed from one or more frame members joined together, including a front frame member, each frame member having an inner frame wall, an opposed outer frame wall, a top wall and an opposed bottom, said inner frame wall being adapted to prevent small hive beetles and their larvae from crawling up the wall of the frame member;
- an opening for bees to enter and exit the beehive via the trap, said opening for bees comprising a first gap defined between at least a portion of the top wall of the front frame member and a lower edge of the beehive;
- a small hive beetle entry located within the opening for bees, said small hive beetle entry comprising:
    - a second gap defined between the at least a portion of the top wall of the front frame member and a rail extending above and parallel to the front frame member, said second gap having a height sufficient to enable a small hive beetle to enter the second gap; and
    - at least one channel located beneath the rail and extending laterally at least partially across the inner frame wall of the front frame member, said channel configured to direct small hive beetles and their larvae that enter the small hive beetle entry away from the hive;
- a corrugated panel held by the frame and adapted to direct the beetles and the larvae that evade the small hive beetle entry into troughs of the corrugated panel, said panel further including at least one opening within each trough that allow the beetles and the larvae to pass through the opening; and a removable tray located beneath the at least one channel and the corrugated panel for collecting the beetles and the larvae that pass through the channel and the opening and are trapped beneath the panel.

According to a third aspect of the present invention, there is provided a frame for use or when used with the small hive beetle trap of the first or second aspects, said frame being configured to hold at least one channel and a corrugated panel of the small hive beetle trap, and including one or more frame members, preferably wherein each frame member has an inner frame wall adapted to prevent small hive beetles and their larvae from crawling up the wall of the frame member.

According to a fourth aspect of the present invention, there is provided at least one channel for use or when used with the small hive beetle trap of the first or second aspects, said channel configured to form part of a small hive beetle entry of the small hive beetle trap and adapted to direct small hive beetles and their larvae that enter the entry away from a hive.

According to a fifth aspect of the present invention, there is provided a corrugated panel for use or when used with the small hive beetle trap of the first or second aspects, said panel configured to be held by a frame of the small hive beetle trap and adapted to direct small hive beetles and their larvae that evade a small hive beetle entry into troughs of the panel, said panel further including at least one opening within each trough to allow the beetle and the larvae to pass through the opening.

According to a sixth aspect of the present invention, there is provided a removable tray for use with or when used with the small hive beetle trap of the first or second aspects, said tray being locatable beneath at least one channel and a corrugated panel of the small hive beetle trap to collect and trap small hive beetles and their larvae that pass through the channel and openings in the panel.

According to a seventh aspect of the present invention, there is provided a beehive including the small hive beetle trap of the first or second aspects.

Advantageously, the small hive beetle trap of the present invention provides an effective trap for trapping small hive beetles and their larvae. The small hive beetle entry functions as a first line of defence to direct beetles and their larvae entering the hive via the trap into the removable tray beneath via the at least one channel. The corrugated panel of the trap acts as a second line of defence to direct or bias beetles and their larvae that evade the small hive beetle entry into the troughs of the panel and ultimately through one of the openings in the troughs and into the removable tray beneath. The above two lines of defence provide effective entrapment of the beetles and their larvae advantageously without the use of or need for an attractant, which makes the trap of the present invention a more cost-effective and less labour-intensive alternative to existing traps on the market.

The beehive is preferably an artificial beehive.

The beehive may typically include one or more hive bodies (i.e., generally rectangular boxes each without a top or bottom) that are stacked atop one another. In use, a beehive may be expanded or reduced by adding or removing stacked hive bodies.

Each hive body may include a plurality of vertically hung frames. The frames may be hung parallel to one another. Each frame is typically a thin rectangular structure formed of wood or plastic and configured to hold comb formed by the bees. In use, a hive body may contain any suitable number of vertically hung frames positioned side by side to fill the hive body and leave sufficient space between each frame and between the end frames and the hive body. Each frame may further be reinforced with wire to allow honey to be centrifugally spun out of the comb formed on the frame without substantially damaging the comb.

The lowermost hive body of the beehive may sit atop the trap of the present invention. The opening for bees may be in fluid communication with the lowermost hive body to enable bees to enter and exit the hive via the trap.

The beehive may include an outer cover located atop the uppermost hive body to provide weather protection for the hive. The hive may further include an inner cover located between the outer cover and the uppermost hive body to provide insulation between an overly hot or cold outer cover and the hive.

The beehive may also include a hive stand atop of which the hive and trap may rest. The stand may provide clearance between the beehive and trap and a ground or supporting surface. The hive stand may include a landing board for the bees.

The trap of the present invention may be of any suitable size, shape and construction and formed from any suitable material or materials.

For example, the trap may be circular, rectangular, oblong or oval-shaped.

Likewise, the trap may be formed from wooden, plastic or metal material or materials. Preferably, the trap may be formed from a combination of wooden, plastic and metal materials.

As indicated, the trap is configured to be located beneath a lowermost hive body of the hive, preferably as a replacement, or an alternative to, a bottom board for the hive. As such, the trap generally will be of a size and shape to match the shape of the hive. Typically, the trap may be rectangular to match commonly found rectangular-shaped hives.

The trap may also be configured to rest atop a hive stand to provide clearance between the hive and trap and a ground or supporting surface.

The frame of the trap will generally be formed from more than one frame member. Typically, the frame may be formed from at least two frame members, preferably at least four frame members.

Each frame member may have an elongate shape. In some embodiments, each frame member may be curved. In preferred embodiments, each frame member may be linear.

The frame members may have any suitable profile shape. For example, each frame member may have a profile shape that is rectangular, circular, triangular, pentagonal, hexagonal, heptagonal, octagonal or any variation or combination thereof. Typically, each frame member will have a substantially rectangular profile shape.

Each frame member may have at least four walls including an inner frame wall, an opposed outer frame wall, a top wall and an opposed bottom wall. Each frame member may further have at least two ends, each end configured to join with an adjacent end or end portion of another frame member to form the frame, either directly or indirectly by a joining component, such as, e.g., a corner connector.

The inner frame wall, in use, is the wall of the frame member that faces inwardly when the frame member is joined with other frame members to form the frame.

Likewise, the outer frame wall, in use, is the wall of the frame member that faces outwardly when the frame member is joined with other frame members to form the frame.

The top wall, in use, is the wall of the frame member that faces the lowermost hive body of the hive when the frame member is joined with other frame members to form the frame. The top wall may engage with the lowermost hive body of the hive, either directly or indirectly.

The bottom wall, in use, is the wall of the frame member that faces the ground or support surface or a hive stand if present when the frame member is joined with other frame members to form the frame. If a hive stand is present, the bottom wall may engage with the hive stand, either directly or indirectly.

The frame includes a front frame member defining an opening for bees to enter and exit the hive via the trap, an opposed rear frame member and opposed side frame members.

The opening for bees to enter and exit the hive is preferably in the form of a first gap defined between at least a portion of the top wall of the front frame member and a lower edge of the lowermost hive body, when resting or located atop the trap, for example.

In some embodiments, the at least a portion of the top wall defining the first gap may be recessed.

The trap also includes a small hive beetle entry within the opening for bees. The small hive beetle entry includes a second gap defined between the at least a portion of the top wall of the front frame member and a rail extending above and parallel to the front frame member. The second gap has a sufficient height to enable a small hive beetle to enter the second gap, but preferably not free passage of bees. By "free passage" it is meant passage of a bee on its own volition.

Like the frame members forming the frame, the rail may have an elongate shape, preferably linear. The rail may have any suitable profile shape such as, e.g., rectangular, circular, triangular, pentagonal, hexagonal, heptagonal, octagonal or any variation or combination thereof. Preferably, however, the rail may have a substantially rectangular profile shape.

The rail may include opposed surfaces, including an upper surface and an opposed lower surface. The opposed surfaces may be joined together by interconnecting edges including opposed side edges and opposed end edges.

The rail may extend longitudinally between the opposed end edges.

Each end edge may be joined to an inner frame wall of a respective side frame member, either directly or indirectly by a joining component, such as, e.g., by a connector, bracket or the like.

For example, in some embodiments, each end edge of the rail may be at least partially received in corresponding recesses defined at least partially along an inner wall of each of the opposed side frame members, preferably at or near the ends of the side frame members adjacent the front frame member.

In preferred embodiments, the rail may at least partially overlap the front frame member and the corrugated panel.

The small hive beetle entry further includes at least one channel. The channel is located beneath the rail and extends laterally at least partially across the inner frame wall of the front frame member. The channel may preferably extend longitudinally at least partially between the top wall and the opposed bottom wall of the front frame member. The channel is configured to direct small hive beetles and their larvae away from the hive into the removable tray located beneath.

The channel may be of any suitable size, shape and construction, and may be formed from any suitable material or materials. Typically, the channel may be formed form plastic material.

Generally, the channel may be of tubular construction. The channel may have any suitable profile shape sized and shaped to enable a small hive beetle and/or larvae to enter and exit the channel. For example, the channel may have a profile shape that is rectangular, circular, triangular, pentagonal, hexagonal, heptagonal, octagonal or any variation or combination thereof. Typically, the channel may a substantially rectangular profile shape.

The channel may have an entry opening and an opposed exit opening for small hive beetle and their larvae to respectively enter and exit the channel. The entry opening may be located adjacent the top wall of the front frame member, preferably adjacent the edge of the top wall and the inner frame wall of the front frame member. The exit opening may be located above the removable tray, preferably such that small hive beetle and their larvae may exit the channel and fall or drop atop the removable tray where they are trapped.

In some embodiments, the small hive beetle entry may include more than one channel. For example, the entry may include at least two channels, at least three channel, at least four channels, at least five channels, at least six channels, at least seven channels, at least eight channels, at least nine channel, at least 10 channels, at least 15 channels, at least 20 channels, at least 25 channels, at least 30 channels, at least 35 channels, at least 40 channels, at least 45 channels or even at least 50 channels.

The channels may be arranged next to one another in a side-by-side arrangement or may be spaced at least partially across the inner frame wall of the front frame member, preferably the former.

In preferred embodiments, the small hive beetle entry may include a plurality of channels arranged next to one another in a side-by-side arrangement at least partially across the inner frame wall of the front frame member. Each channel may extend longitudinally at least partially between the top and the opposed bottom frame walls of the front frame member.

The inventor has found that small hive beetle entering the bee hive via the trap are typically attacked by guard bees posted at the opening for bees. Consequently, a small hive beetle tends to take cover within the small hive beetle entry beneath the rail. Once a small hive beetle tires or becomes frustrated from seeking cover beneath the rail, the beetle may attempt to escape by entering the at least one channel and exiting the channel via the exit opening only to be trapped in the removable tray positioned beneath the panel.

In some embodiments, the inner frame wall of each frame member is adapted to prevent small hive beetles and their larvae from crawling up the wall into the one or more hive bodies located above. This may be achieved in any suitable way.

For example, in some embodiments each frame member may include a strip, lining or coating extending along at least a portion of the inner frame wall, preferably at or near the upper edge adjacent the top wall of the frame member. The strip, lining or coating may preferably be slippery to prevent and/or at least frustrate a beetle or larvae's attempts to crawl up the wall.

In one embodiment, the strip, lining or coating may be formed from or include a material or materials which render the at least a portion of the inner frame wall slippery to the beetle and larvae. The material or materials may be any suitable material or combination of materials, such as, e.g., a soap and/or fatty substance, electrostatically charged powders, Teflon™ or polytetrafluoroethylene (PTFE).

In another embodiment, the strip, lining or coating may be formed from a slippery material, such as, e.g., a hard smooth surface plastic (e.g., a polycarbonate or a polymethyl methacrylate). Preferably, the material may have a low coefficient of friction.

In some embodiments, the strip, lining or coating additionally may longitudinally extend along at least a portion of the top wall of the frame member, preferably at or near the upper edge adjacent the inner frame wall of the frame member.

In other embodiments, each frame member may include an inwardly extending rim that may extend along and from the inner frame wall of each frame member, preferably at or near the upper edge adjacent the top wall of the frame member.

In use, the inwardly extending rim may function as a barrier which the beetle and the larvae are unable to crawl around to enter the one or more hive bodies located atop the trap. Preferably, as with the strip, lining or coating described above, the rim may be formed from a material that is slippery to beetles and/or their larvae, such as, e.g., a hard smooth surface plastic (e.g., a polycarbonate or a polymethyl methacrylate). Preferably, the material may have a low coefficient of friction.

In preferred embodiments, each frame member may include a strip having an inwardly extending rim as described above. As described above, the strip may extend along at least a portion of the inner frame wall, preferably at or near the upper edge adjacent the top wall of the frame member. The rim may extend inwardly from an upper edge of the strip.

The strip and rim may be integrally formed from a material that may be slippery to prevent and/or at least frustrate a beetle or larvae's attempts to crawl up the wall. Preferably, the material may be a material that is slippery to beetles and/or their larvae as previously described. More preferably, the material may be a hard smooth surface plastic, such as, e.g., a polycarbonate or a polymethyl methacrylate. Most preferably, the material may have a low coefficient of friction.

The strip, lining, coating and/or rim may be fastened to the inner frame wall of each frame member by any suitable means. Typically, the strip, lining, coating and/or rim may be fastened by one or more mechanical fasteners (e.g., threaded fasteners and/or staples) and/or a chemical fastener (e.g., adhesive).

The frame may hold the corrugated panel in any suitable way.

For example, in some embodiments, the panel may be held in place by a panel recess defined in two, three or all four of the frame members, preferably three or four frame members. Each panel recess may be of any suitable size and shape to at least partially receive an outer edge of the panel. Typically, each panel recess may be in the form of a shaped groove or channel extending along the inner frame wall of a frame member, preferably at a location at or near a midpoint between the top and bottom frame walls of the fame member.

In other embodiments, the panel may be held in place by one or more panel support members fastened to the inner frame wall of at least two, three or all four of the frame members, preferably three or four frame members. In use, the panel may sit atop the panel support members.

The one or more panel support members may be fastened to the frame members in any suitable way. Typically, each panel support member may be fastened to an inner frame wall of a frame member by one or more mechanical fasteners (e.g., threaded fasteners and/or staples) and/or a chemical fastener (e.g., adhesive), preferably at a location at or near a midpoint between the top and bottom frame walls of the fame member.

The panel may or may not be fastened to the panel support members. If fastened, the panel may be fastened by one or more mechanical fasteners and/or a chemical fastener as described above.

In some embodiments, a forward edge of the panel may be fastened to the rail of the small hive beetle entry. Generally, the forward edge may be fastened by one or more mechanical fasteners and/or a chemical fastener as described above.

The corrugated panel may be of any suitable size, shape and construction and formed from any suitable material or materials. Generally, the panel may be of a size and shape to fill the frame. When fitted, the forward edge of the panel may preferably sit flush with the at least one channel of the small hive beetle entry.

The corrugations (i.e., repeating crests and troughs) of the panel may be of any suitable pitch (i.e., the distance between two adjacent crests) and depth (i.e., the height from the top of a crest to the bottom of a trough) to direct beetles and their larvae into the troughs. Likewise, the corrugations may be of any suitable shape and extend in either a lengthwise or width wise direction along or across the panel.

The pitch of the corrugations may be between 20 mm and 150 mm, between 30 mm and 150 mm, between 40 mm and 150 mm, between 40 mm and 100 mm or between 40 mm and 80 mm. Preferably, the pitch of the corrugations may be between 50 mm and 80 mm. Most 7 preferably, the pitch of the corrugations may be about 70 mm.

The depth of the corrugation may be at least 5 mm, at least 10 mm, at least 15 mm, at least 20 mm, at least 25 mm, at least 30 mm, at least 35 mm, at least 40 mm, at least 45 mm, at least 50 mm, at least 60 mm, at least 70 mm, at least 80 mm, at least 90 mm or even at least 100 mm. Preferably, the depth of the corrugations may be at least 15 mm. More preferably, the depth of the corrugations may be about 18 mm.

The panel may include at least 1, at least 2, at least 3, at least 4, at least 5, at least 6, at least 7, at least 8, at least 9 or at least 10 corrugations extending across a width or length of the panel. Typically, the panel may include between 1 and 4 corrugations.

Similarly, the corrugations may be of any shape suitably adapted to direct the beetles and their larvae into an adjacent trough of the panel. The corrugations may typically have a shape to prevent or at least minimise the chance of a beetle or larvae being able to escape the trap by standing atop a crest of a corrugation. For example, the corrugations may have a smooth or rounded shape or an angular shape.

To at least partially assist in directing beetles and their larvae into troughs of the corrugated panel, the panel may preferably be formed from, or be at least partially formed from, a material that is slippery to beetles and/or their larvae, such as, e.g., a hard smooth surface plastic (e.g., a polycarbonate or a polymethyl methacrylate). Preferably, the material may have a low coefficient of friction.

In one embodiment, the panel may be integrally formed from the material that is slippery to beetles and/or their larvae.

In another embodiment, the panel may include an upper surface cover or coating formed from the material that is slippery to beetles and/or their larvae.

As described above, the corrugated panel may further include at least one opening within each trough that allows beetles and the larvae to pass through the opening, preferably to the removable tray located beneath the panel. The premise of the openings is that the beetle or larvae will tire or grow frustrated of being continually directed into the troughs of the corrugated panel and will attempt to escape through one of the openings only to be trapped in the removable tray positioned beneath the panel.

Each trough may preferably include more than one opening spaced along the length of the trough. For example, each trough may include at least 2, at least 3, at least 4, at least 5, at least 6, at least 7, at least 8, at least 9 or at least 10 openings within each trough. Preferably, each trough includes a plurality of openings spaced along a length of the trough.

In some embodiments, each trough may include pairs of openings spaced along a length of the trough.

The openings may be of any suitable size and shape to allow passage of the beetles and the larvae, but preferably not free passage of bees (as defined previously).

Advantageously, the inventor has found that the presence of the openings in the tray results in a tidier beehive with the bees often pushing waste products and even dead bees through the openings into the tray beneath rather than out the opening for bees to enter and exit of the hive.

The openings may be substantially rectangular, oblong, circular, oval or ovoid in shape, preferably circular.

Each opening may have a diameter, or a maximum width or length, of about 2 mm, about 2.25 mm, about 2.5 mm, about 2.75 mm, about 3 mm, about 3.25 mm, about 3.5 mm, about 3.75 mm, about 4 mm, about 4.25 mm, about 4.5 mm, about 4.75 mm, about 5 mm, about 5.25 mm, about 5.5 mm, about 5.75 mm, about 6 mm, about 6.25 mm, about 6.5 mm, about 6.75 mm, about 7 mm, about 7.25 mm, about 7.5 mm, about 7.75 mm, about 8 mm, about 8.25 mm, about 8.5 mm, about 8.75 mm, about 9 mm, about 9.25 mm, about 9.5 mm, about 9.75 mm or about 10 mm, preferably between about 3.5 mm and about 5.5 mm, more preferably between about 4 mm and about 5 mm, most preferably about 4.5 mm.

The openings may be formed in the troughs of the corrugated panel by any suitable means. For example, the openings may be punched or drilled in the panel. If punched or drilled, the inventor has found that it is important that the chad or burr is removed from an edge of each opening as the beetle is capable of climbing back through an opening to an upper side of the panel by gripping onto a chad or burr hanging from an underside of an edge of the opening.

As described above, the trap further includes a removable tray located beneath the corrugated panel for collecting the beetles and larvae that pass through the openings in the troughs of the corrugated panel.

The removable tray will typically be of a similar size and shape as the panel but without corrugations. The tray may be formed from wood, plastic or metal material or materials, or a combination thereof. Generally, the tray will be formed of a material or have a material coating that may be readily cleaned, such as, e.g., a metal or plastic material or materials.

The tray may be removably attached to the frame of the trap in any suitable way.

Typically, the tray may be slidably attached to or associated with the frame of the trap, preferably such that the tray may be slid between a stowed position in which the tray is positioned beneath the at least one channel and the corrugated panel and a removed position in which the tray may be completely removed from the trap. In use, the tray may be slid out from beneath the at least one channel and the corrugated panel of the trap to inspect the tray, remove any trapped beetles and/or larvae, and/or clean the tray.

The tray may include an upper surface, an opposed lower surface, opposed side edges, a forward edge and an opposed rear edge. The rear edge may further include a handle assist in sliding the tray between the stowed position and the removed position. In some embodiments, the tray may include at least one sidewall extending from the upper surface.

In some embodiments, the tray may slide along rails extending at least partway along the inner or bottom frame walls of at least two frame members, preferably at least two opposed side frame members of the frame. Each rail may at least partially receive a side edge of the removable tray. In some embodiments, the rails or the side edges of the tray may further include rollers or bearings to facilitate in the sliding of the tray.

In other embodiments, the tray may slide within tray recesses defined in at least two frame members, preferably at least two opposed side frame members. Each recess may be of a suitable size and shape to at least partially receive a side edge of the tray. Typically, each recess may be in the form of a shaped groove or channel extending at least partway along the inner frame wall of a side frame member, preferably at or near a bottom frame wall of the side frame member. In one such embodiment, the at least two opposed side frame members may be joined together by at least one cross frame member extending laterally between the two opposed side frame members. In such an embodiment, the tray may additionally be supported by the at least one cross frame member.

In yet other embodiments, the tray may slide beneath the frame of the trap on a shelf extending between at least two opposed side frame members of the frame of the trap. In a preferred embodiment, a further frame member may extend between the at least two opposed side frame members, preferably at or near a common end of the at least two side frame members. The further frame member may be configured to at least partially receive a forward edge of the tray when the tray is slidably positioned entirely beneath the corrugated panel.

In preferred embodiments, an insecticide or organic matter may be added to the removable tray to kill beetles and larvae trapped in the tray. Preferably, the insecticide is a mechanical insecticide such as, e.g., diatomaceous earth. In use, the mechanical insecticide will typically be sprinkled over an upper surface of the tray. In some embodiments, however, the mechanical insecticide may be applied to one or more depressions or wells defined in the upper surface of the tray.

In some embodiments, the removable tray may further include one or more openings extending through the upper and lower surfaces of the tray. The openings may preferably be covered with mesh so as not to allow the escape of beetles or larvae through the openings.

Advantageously, the one or more openings may at least partially assist in heat exchange between the hive and the external environment, particularly heat loss during the warmer months of the year.

The inventor envisages that the removable tray may be substituted with a solid panel during cooler months of the year to conversely at least partially assist in reducing heat loss from the hive. The small hive beetle has been found to be generally dormant or substantially less active during the cooler months of the year. As such, the removable tray can be substituted with the solid panel during this period of the year with little or no risk of the beehive being infested with small hive beetles or their larvae.

The solid panel may be of any suitable size, shape and form. Typically, the solid panel may be of a similar size as the removable tray. Preferably, the solid panel may be thicker than the removable tray to at least partially assist in reducing heat loss from the hive. In some embodiments, the upper surface of the solid panel may be shaped to at least partially complement the panel located above. For example, the solid panel may include one or more parallel channels or grooves sized and shaped to at least partially receive a lower surface of one or more troughs of the corrugated panel, when the solid panel is positioned beneath the corrugated panel.

According to an eighth aspect of the present invention, there is provided a method of treating or preventing a small hive beetle infestation of a beehive, said method including:
replacing a bottom board of the beehive with the small hive beetle trap of the first or second aspects.

The method may include an initial step of calming the bees prior to said replacing. The bees may be calmed by applying smoke or similar calming agent to the hive, for example.

The replacing may include lifting one or more hive bodies of the beehive off the bottom board and the hive stand, if present.

The bottom board may then be substituted with the small hive beetle trap of the present invention.

The replacing may include aligning and lowering the one or more hive bodies atop the small hive beetle trap.

The method may further include a step of periodically inspecting the removable tray of the trap to determine whether small hive beetles and/or their larvae are being trapped, wherein the presence of trapped small hive beetles and/or larvae is indicative that the beehive still has the small hive beetle infestation.

The method may further include a step of cleaning the removable tray, once inspected, and restoring the tray to the trap.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows.

DETAILED DESCRIPTION

FIGS. 1 to 8 show a small hive beetle trap (100) according to an embodiment of the present invention. The small hive beetle trap (100) is configured to be located beneath a beehive as a replacement or substitute bottom board for the beehive.

The trap (100) includes a rectangular frame (110) defining an opening (120; not shown in FIGS. 3, 7 and 8) for bees to enter and exit the hive via the trap (100), a small hive beetle entry (130; not shown in FIG. 7) located within the opening (120; not shown in FIGS. 3, 7 and 8) for directing small hive beetle and their larvae away from the hive, a corrugated panel (140; not shown in FIG. 7) held by the frame (110) for directing beetles and their larvae away from the hive that evade the small hive beetle entry (130; not shown in FIGS. 7 and 8), and a removable tray (150; visible in FIGS. 5 to 8) located beneath the small hive beetle entry (130; not shown in FIGS. 7 and 8) and corrugated panel (140; not shown in FIG. 7) for receiving and trapping beetles and their larvae diverted away from the hive by the small hive beetle entry (130; not shown in FIGS. 7 and 8) and the corrugated panel (140).

Figure 1:
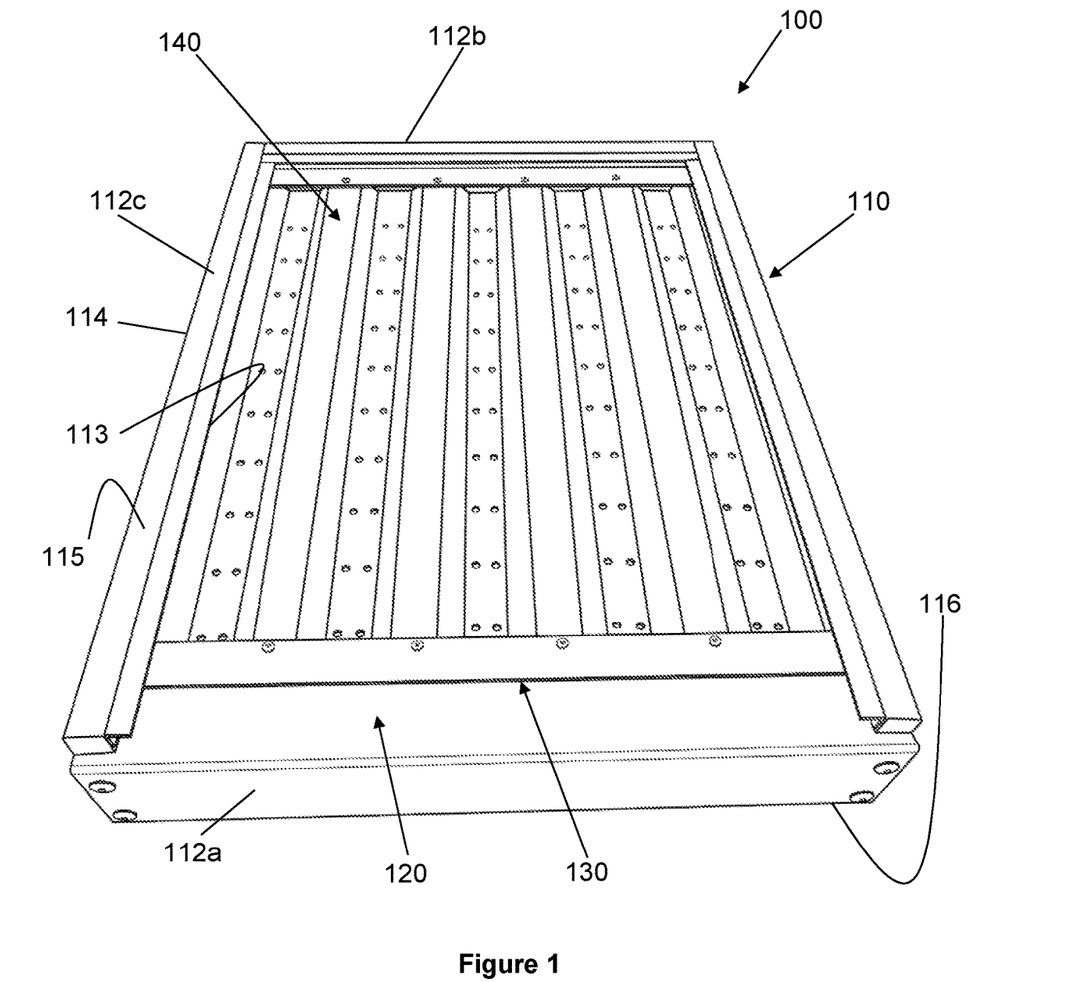
FIG. 1 is a photograph showing an upper perspective view of a small hive beetle trap according to an embodiment of the present invention.

Referring to FIG. 1, the frame (110) is formed from four frame members (112) joined together, including a front frame member (112a), an opposed rear frame member (112b) and opposed side frame members (112c).

Each frame member (112) has four frame walls including an inner frame wall (113), an opposed outer frame wall (114), a top wall (115) and an opposed bottom wall (116; not visible). Each frame member (112) further includes two ends, each configured to be directly joined with an adjacent end or end portion of an adjacent frame member (112) to form the frame (110).

The opening (120) for bees to enter and exit the hive comprises a first gap defined between at least a portion of the top wall (115) of the front frame member (112a) and a lower edge of a beehive, when resting or located atop the trap (100). The first gap is created by the top wall (115) of the front frame member (112a) being vertically off set relative to the top walls (115) of the other frame members (112b, 112c).

Figure 2:
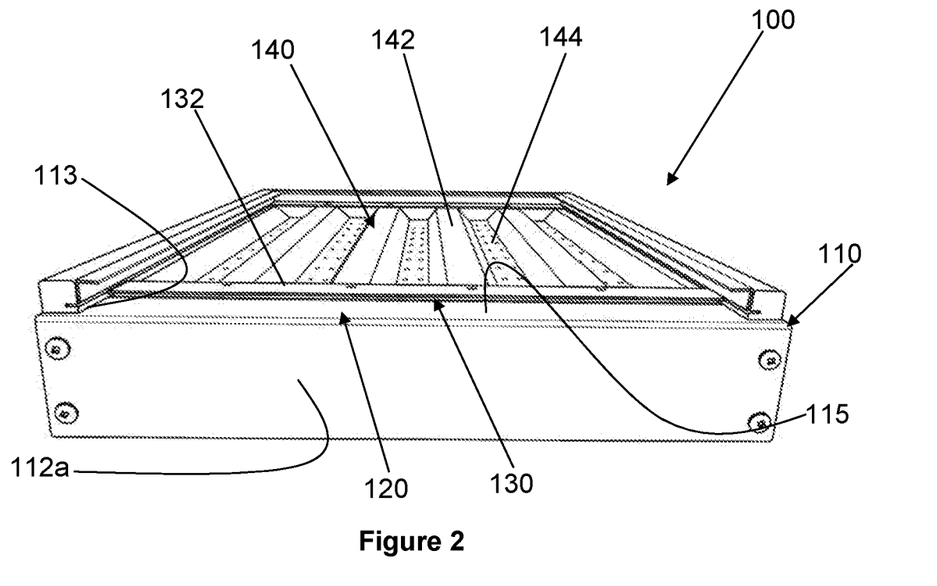
FIG. 2 is a photograph showing a front view of the small hive beetle trap shown in FIG. 1.

Referring to FIG. 2, the small hive beetle entry (130) is located within the opening (120) for bees. The small hive beetle entry (130) comprises a second gap defined between at least a portion of the top wall (115) of the front frame member (112a) and a rail (132) extending above and parallel to the front frame member (112a). The second gap provides sufficient clearance for a small hive beetle (or larvae) to enter the second gap but not the free passage of bees. By "free passage" it is meant passage of a bee on its own volition.

The rail (132), like the frame members (112), has an elongate linear shape. The rail (132) includes an upper surface and an opposed lower surface interconnected by opposing edges, including opposed side edges and opposed end edges. The rail (132) extends longitudinally between the opposed end edges.

Each end edge of the rail (132) is received within a corresponding recess defined in the inner frame wall (113) of the side frame members (112c).

As shown, the rail (132) partially overlaps the front frame member (112a) and a forward edge of the corrugated panel (140).

Figure 3:
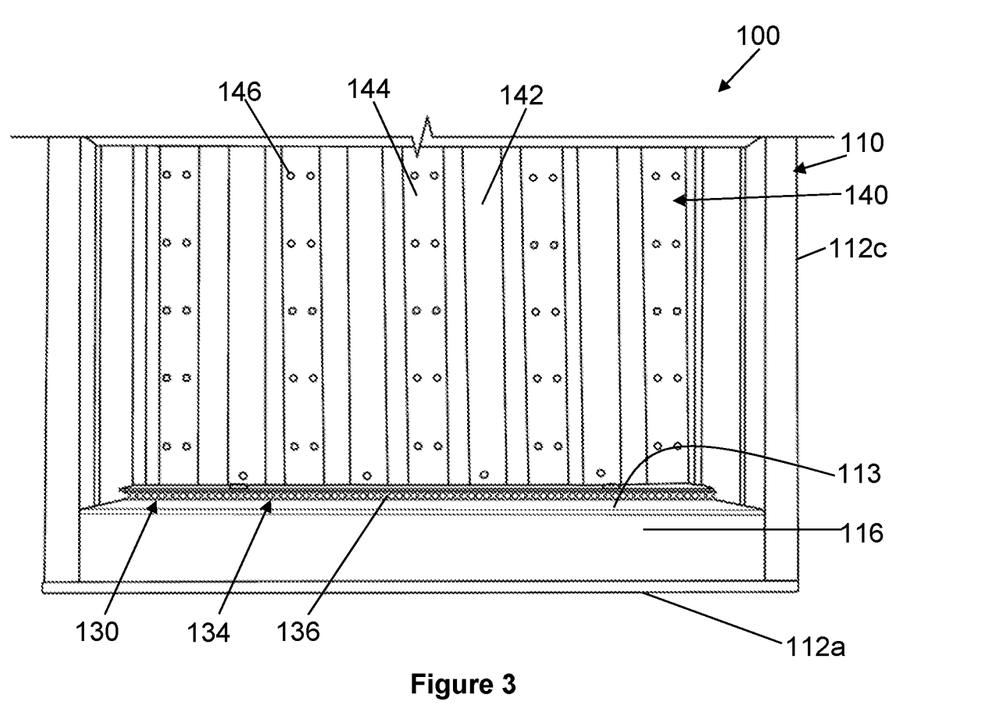
FIG. 3 is a photograph showing a bottom view of part of the small hive beetle trap shown in FIGS. 1 and 2.

Referring to FIG. 3, the small hive beetle entry (130) further includes a plurality of channels (134). The channels (134) are located beneath the rail (132) between the front frame member (112a) and the forward edge of the corrugated panel (140). The channels (134) are arranged side-by-side across the inner frame wall (113) of the front frame member (112a) between the opposed side frame members (112c).

Each channel (134) is tubular in shape and extends longitudinally from a location substantially flush with the top wall (115; not visible) to a location at least partially towards the bottom wall (116) of the front frame member (112a).

Each channel (134) is configured to direct small hive beetles and their larvae away from the hive into the removable tray (150; not shown) of the trap (100), when located beneath a beehive.

Each channel (134) has a rectangular profile shape including an entry opening (not visible) and an opposed exit opening (136) for the small hive beetle and larvae to respectively enter and exit the channel (134) and fall into or drop atop the removable tray (150; not shown) where they are trapped.

Referring back to FIGS. 2 and 3, the corrugated panel (140) of the trap (100) is held in the frame (110) by panel recesses (not shown) defined in the inner frame wall (113) of each frame member (112). Each panel recess is in the form of a shaped groove or channel adapted to at least partially receive an outer edge of the panel (140).

The corrugated panel (140) includes about 4 corrugations (i.e., repeating crests (142) and troughs (144) extending lengthwise along the panel (140). Generally, the corrugations will be of a pitch (i.e., the distance between adjacent crests (142)), depth (i.e., the height from the top of a crest (142) to the bottom of a trough (144)) and shape to direct or bias beetles and/or their larvae into the troughs (144) of the corrugations.

To assist in directing beetles and/or their larvae into the troughs (144) of the corrugations of the panel (140), the corrugated panel (140) is formed from material that is at least partially slippery to the beetles and their larvae. Typically, a smooth hard plastic, such as, e.g., polycarbonate or polymethyl methacrylate).

Best shown in FIG. 3, openings (146) provided in the troughs (144) of the panel (140) are spaced in pairs along a length of each trough (144). Typically, each trough (144) includes about 20 openings (146; only partly shown).

Each opening (146) is circular in shape with a diameter of about 4.5 mm, which is suitably sized to allow the passage of beetles and their larvae through the openings (146) but not the free passage of bees. As indicated earlier, by "free passage" it is meant the passage of a bee on its own volition.

In use, the premise of the openings (146) is that a beetle or larvae will tire or grow frustrated of being continually directed or biased into the troughs (144) of the corrugated panel (140) and will attempt to escape through one of the openings (146) only to be trapped in the removable tray (150; shown in FIGS. 6 and 7) located beneath the panel (140).

Figure 6:
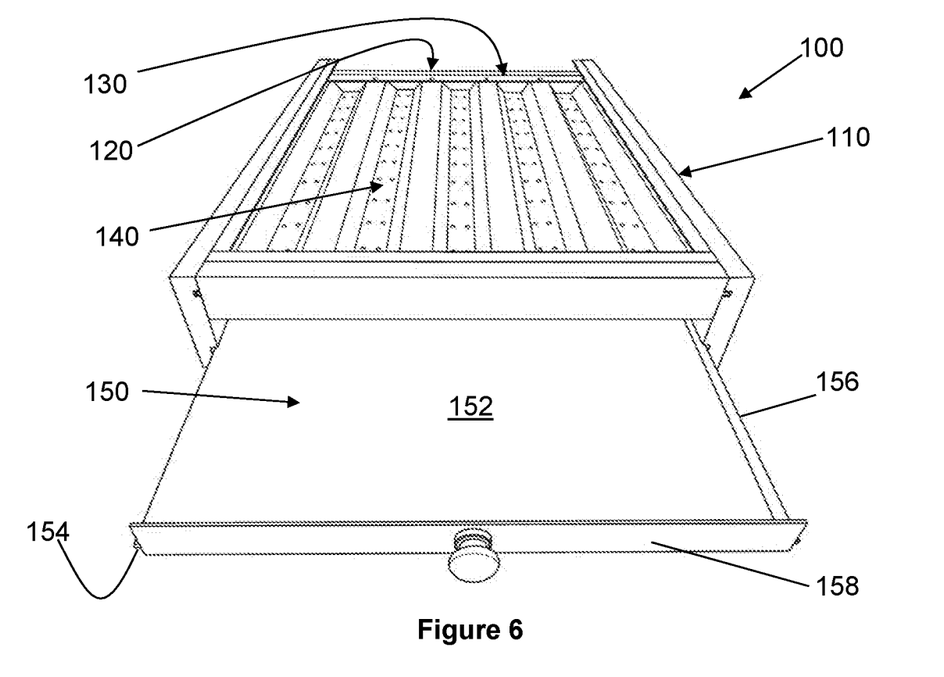
FIG. 6 is a photograph showing an upper perspective rear view of the small hive beetle trap shown in FIGS. 1 to 5 with a removable tray party removed.
Figure 7:
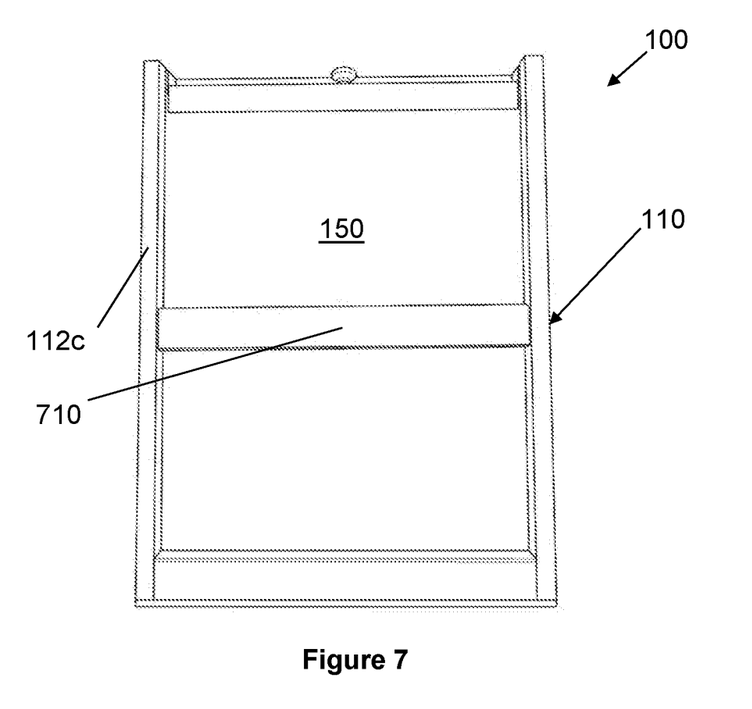
FIG. 7 is a photograph showing a bottom view of the small hive beetle trap as shown in FIGS. 1 to 6 and a top view of the removable trap removed and arranged next to the small hive beetle trap.
Figure 8:
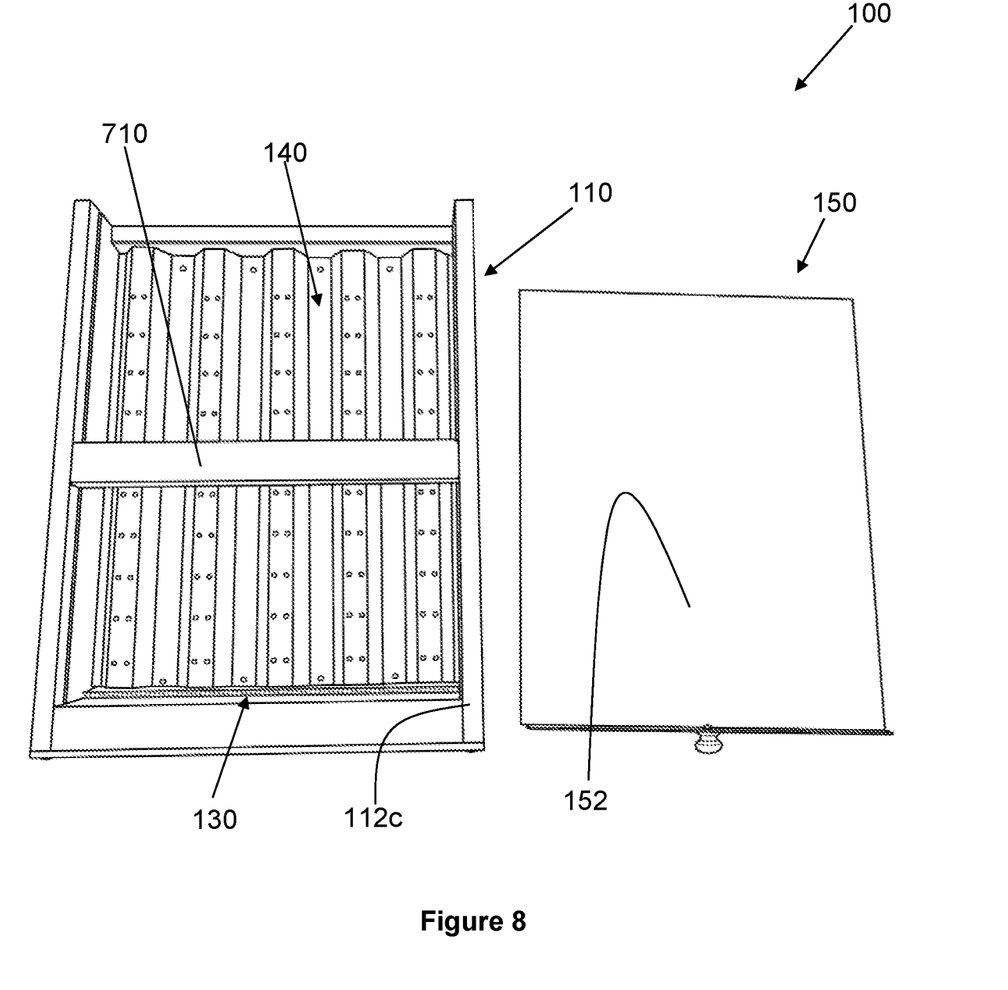
FIG. 8 is a photograph showing a bottom view of the small hive beetle trap as shown in FIGS. 1 to 7.

Referring to FIGS. 6 to 8, the removable tray (150) is of a similar size and shape as the panel (140) but without the corrugations. The tray (150) is formed from plastic material (PVC) and is slidably associated with the trap (100).

Referring briefly between FIGS. 7 and 8, the tray (150) is slideable between a stowed position in which the tray (150) is positioned beneath the corrugated panel (140; not shown in FIG. 7) and a removed position in which the tray (150) can be completely removed from the trap (100; shown in FIG. 8). In use, the tray (150) is slid out from beneath the corrugated panel (140; not shown in FIG. 7) of the trap (100) to inspect the tray (150), remove trapped beetles and/or larvae, and/or to clean the tray (150).

Referring again to FIG. 6, the tray (150) includes an upper surface (152), an opposed lower surface (154), opposed side edges (156), a forward edge (not visible) and an opposed rear edge (158).

Figure 5:
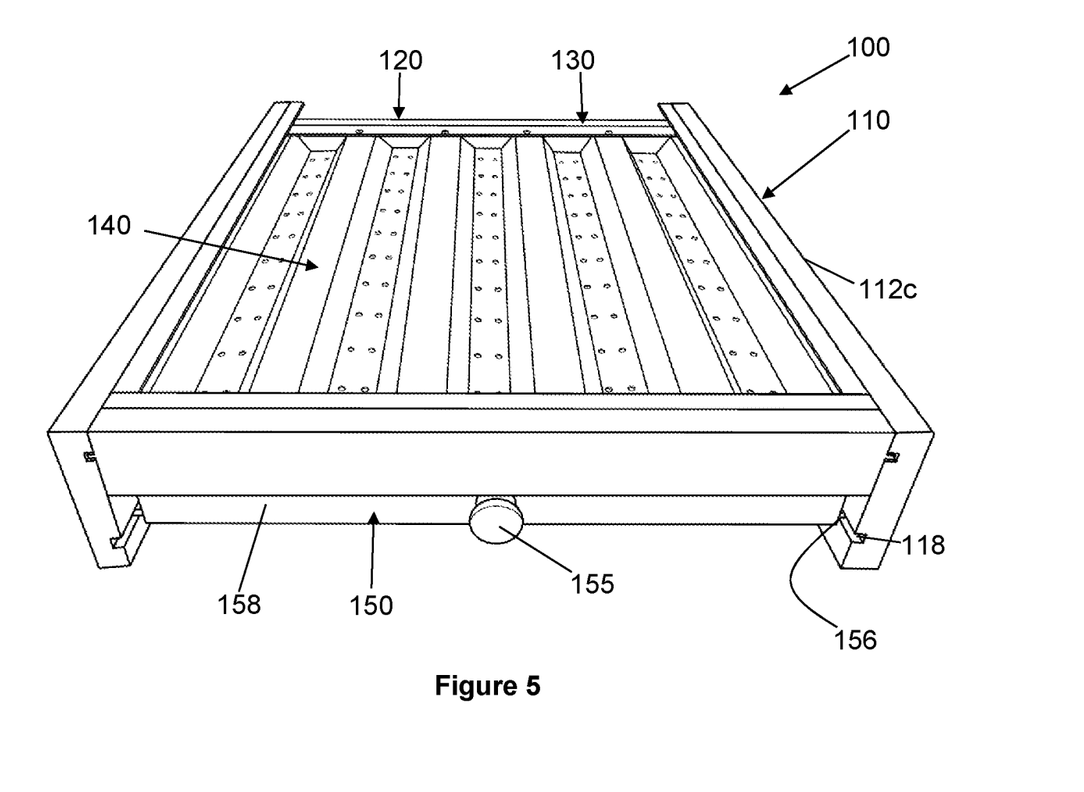
FIG. 5 is a photograph showing an upper perspective rear view of the small hive beetle trap shown in FIGS. 1 to 4.

Best shown in FIG. 5, the rear edge (158) of the tray (150) includes a handle (155) to assist in sliding the tray (150) between the stowed and removed positions.

As shown, the tray (150) slides within tray recesses (118) defined in the two opposed side frame members (112c). Each recess (118) is suitably sized and shaped to at least partially receive the side edge (156) of the tray (150).

Referring back to FIGS. 7 and 8, the two opposed side frame members (112c) are joined together by a cross frame member (710) extending laterally between the two opposed side frame members (112c). As shown in FIG. 7, the tray (150) is additionally supported by the cross frame member (710) when in the stowed position.

In use, a mechanical insecticide, such as, e.g., diatomaceous earth, can be added to the upper surface (152) the tray (150) to kill beetles and larvae that become trapped in the tray (150).

Figure 4:
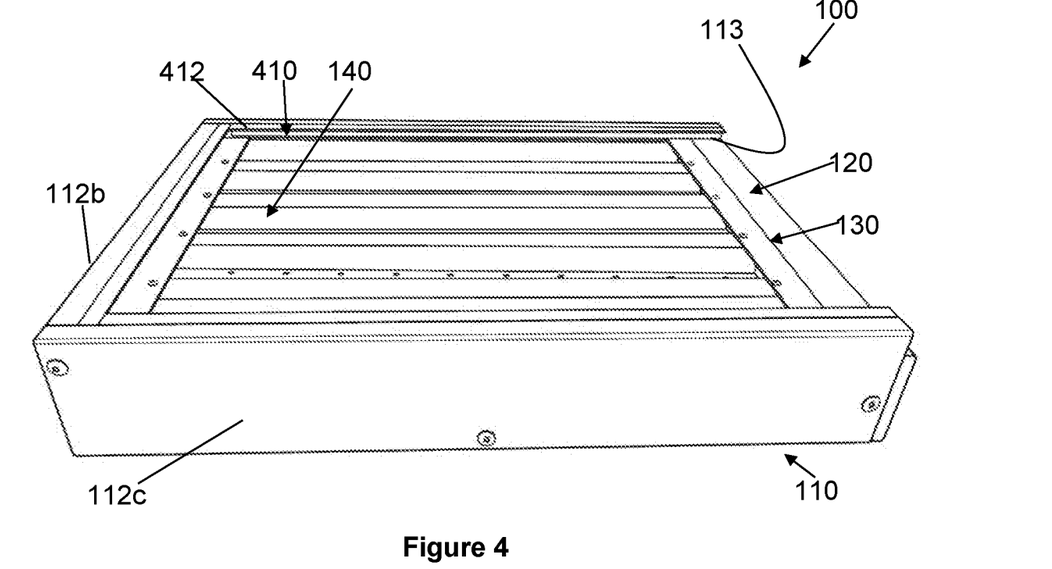
FIG. 4 is a photograph showing an upper perspective side view of the small hive beetle trap shown in FIGS. 1 to 3.

Referring to FIG. 4, the inner frame wall (113) of the rear and side frame members (112b, 112c) of the frame (110) each further includes a strip (410) having an inwardly extending rim (412) to prevent small hive beetles and their larvae from circumventing the corrugated panel (140) and crawling up the inner frame wall (113) into the hive located above.

The strip (410) and rim (412) extend along at least a portion of the inner frame wall (113) of each of the frame members (112b, 112c) at or near an upper edge adjacent the top wall (115). The rim (412) extends inwardly from an upper edge of the strip (410).

The strip (410) and rim (412), like the corrugated panel (140), are integrally formed from a material that is slippery to prevent and/or at least frustrate a beetle or larvae's attempts to crawl up the inner frame wall (113). Typically, a smooth hard plastic, such as, e.g., polycarbonate or polymethyl methacrylate).

Additionally, the rim (412), in use, functions as a barrier that the beetle and their larvae are unable to crawl or climb around to enter the hive located above.

The strip (410) and rim (412) are fastened to the inner frame wall (113) of the frame members (112b, 112c) via the strip (410), which is fastened to the inner frame wall (113) by a number of staples.

A method of fitting the small hive beetle trap (100) as shown in FIGS. 1 to 8 to a beehive is now described in detail.

As an initial step, the method includes calming the bees of the beehive to which the trap (100) is to be fitted. Typically, this is achieved by applying smoke or a similar calming agent to the hive.

The method then includes separating the bottom board and the hive stand, if present, from a remainder of the hive. The remainder of the hive can generally be lifted off and away from the bottom board and the hive stand, if present.

Once separated, the bottom board is substituted with the trap (100) of the present invention.

Once substituted, the remainder of the hive is then aligned and lowered atop the trap (100).

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A small hive beetle trap configured to be located beneath a beehive, said trap comprising:
   a frame formed from one or more frame members, including a front frame member having an inner frame wall, an opposed outer frame wall, a top wall and an opposed bottom wall;
   an opening for bees to enter and exit the beehive via the trap, said opening for bees comprising a first gap defined between at least a portion of the top wall of the front frame member and a lower edge of the beehive;
   a small hive beetle entry located within the opening for bees, said small hive beetle entry comprising:
      a second gap defined between the at least a portion of the top wall of the front frame member and a rail extending above and parallel to the front frame member, said second gap having a height sufficient to enable a small hive beetle or larvae to enter the second gap; and
      a plurality of channels located beneath the rail and arranged in an array next to one another in a side-by-side arrangement extending entirely across the small hive beetle entry, said plurality of channels configured to direct the beetle or the larvae that enter the small hive beetle entry away from the beehive;
   a corrugated panel comprising a plurality of alternating crests and troughs extending lengthwise across the corrugated panel in an orientation perpendicular to a longitudinal axis of the front frame member, said corrugated panel configured to be held by the frame and adapted to direct the beetle or the larvae that evade the small hive beetle entry into said troughs of the corrugated panel, said panel further including a plurality of openings within each of said troughs that allows the beetle or the larvae to pass through the opening; and
   a removable tray located beneath the plurality of channels and the corrugated panel for receiving and trapping the beetle or the larvae that pass through the plurality of channels and the plurality of openings;
   wherein each channel of said plurality of channels has an entry opening and an exit opening for the beetle or the larvae to respectively enter and exit the channel to be trapped in the removable tray located beneath,
   wherein the plurality of channels are located between the front frame member and a forward edge of the corrugated panel so that the entry opening of each said channel lies substantially flush with the top wall of the front frame member and the crests of the corrugated panel, and
   wherein each said channel extends longitudinally in an orientation perpendicular to the longitudinal axis of the front frame member from a location substantially flush with the top wall at least partially towards the bottom wall of the front frame member.

2. The trap of claim 1, wherein the trap is configured to be located beneath a lowermost hive body of the hive.

3. The trap of claim 1, wherein the trap is used as a replacement bottom board of the hive.

4. The trap of claim 1, wherein each channel of said plurality of channels is of tubular construction.

5. The trap of claim 1, wherein the entry opening is located adjacent a frame edge defined by the top wall and inner frame wall of the front frame member.

6. The trap of claim 1, wherein the corrugated panel includes at least 3, at least 4, at least 5, at least 6, at least 7, at least 8, at least 9 or at least 10 corrugations extending across a width or length of the panel.

7. The trap of claim 1, wherein the plurality of openings within each of said troughs of the panel is circular.

8. The trap of claim 7, wherein each of the plurality of openings has a diameter of 4.5 mm.

9. The trap of claim 8, wherein the plurality of openings are spaced along a length of each of the troughs.

10. The trap of claim 9, wherein the plurality of openings are spaced in pairs along the length of the trough.

11. The trap of claim 1, wherein the corrugated panel is formed of a material that is slippery to the beetle or the larvae.

12. The trap claim 11, wherein the material has a low coefficient of friction.

13. The trap of claim 1, wherein the frame further comprises an opposed rear frame member, opposed to said front frame member, and opposed side frame members, and wherein each of the rear frame member and opposed side frame members comprises a strip, lining or coating extending along at least a portion of an inner frame wall of each of the rear frame member and the opposed side frame members that is slippery to prevent or at least frustrate the beetle or the larvae's attempts to crawl up the inner frame wall.

14. The trap of claim 1, wherein the frame further comprises an opposed rear frame member, opposed to said front frame member, and opposed side frame members, and wherein an inner frame wall of each of the opposed rear frame member and the opposed side frame members further comprises an inwardly extending rim extending along and out from the inner frame wall that functions as a barrier which the beetle or the larvae is unable to crawl or climb around.

15. The trap of claim 14, wherein the inwardly extending rim is integrally formed of a material that is slippery to the beetle or the larvae.

16. The trap of claim 1, wherein the removable tray further comprises an insecticide comprising diatomaceous earth sprinkled over an upper surface of the removable tray to kill beetle or larvae trapped in the removable tray.

17. A small hive beetle trap configured to be located beneath a beehive, said trap comprising:
- a frame formed from one or more frame members joined together, including opposed side frame members and a front frame member extending between the opposed side frame members, each of the one or more frame members having an inner frame wall, an opposed outer frame wall, a top wall and an opposed bottom wall, said inner frame wall being adapted to prevent a small hive beetle or larvae from crawling up the inner frame wall of the one or more frame members;
- an opening for bees to enter and exit the beehive via the trap, said opening for bees comprising a first gap defined between at least a portion of the top wall of the front frame member and a lower edge of the beehive;
- a small hive beetle entry located within the opening for bees, said small hive beetle entry comprising:
  - a second gap defined between the at least a portion of the top wall of the front frame member and a rail extending above and parallel to the front frame member, said second gap having a height sufficient to enable the beetle or the larvae to enter the second gap; and
  - a plurality of channels located beneath the rail and arranged in an array next to one another in a side-by-side arrangement extending entirely across the inner frame wall of the front frame member between the opposed side frame members, said plurality of channels configured to direct the beetle or the larvae that enter the small hive beetle entry away from the beehive;
- a corrugated panel comprising a plurality of alternating crests and troughs extending lengthwise across the corrugated panel in an orientation perpendicular to a longitudinal axis of the front frame member, said corrugated panel configured to be held by the frame and adapted to direct the beetle or the larvae that evade the small hive beetle entry into said troughs of the corrugated panel, said panel further including a plurality of openings within each of said troughs that allow the beetle or the larvae to pass through the plurality of openings; and
- a removable tray located beneath the plurality of channels and the corrugated panel for receiving and trapping the beetle or the larvae that pass through the plurality of channels and the plurality of openings,
- wherein each channel of said plurality of channels has an entry opening and an exit opening for the beetle or the larvae to respectively enter and exit the channel to be trapped in the removable trap located beneath,
- wherein the entry opening of each said channel lies substantially flush with the top wall of the front frame member and the crests of the corrugated panel, and
- wherein each said channel extends longitudinally in an orientation perpendicular to the longitudinal axis of the front frame member across the inner frame wall of the front frame member from a location substantially flush with the top wall of the front frame member at least partially towards the bottom wall of the front frame member.

\* \* \* \* \*